Oct. 12, 1948.                M. V. GROVES                2,451,335
                  CONTROL VALVE MEANS FOR POWER OPERATED
                         HYDRAULIC MOTIVE MEANS
Filed March 10, 1944                                   2 Sheets-Sheet 2
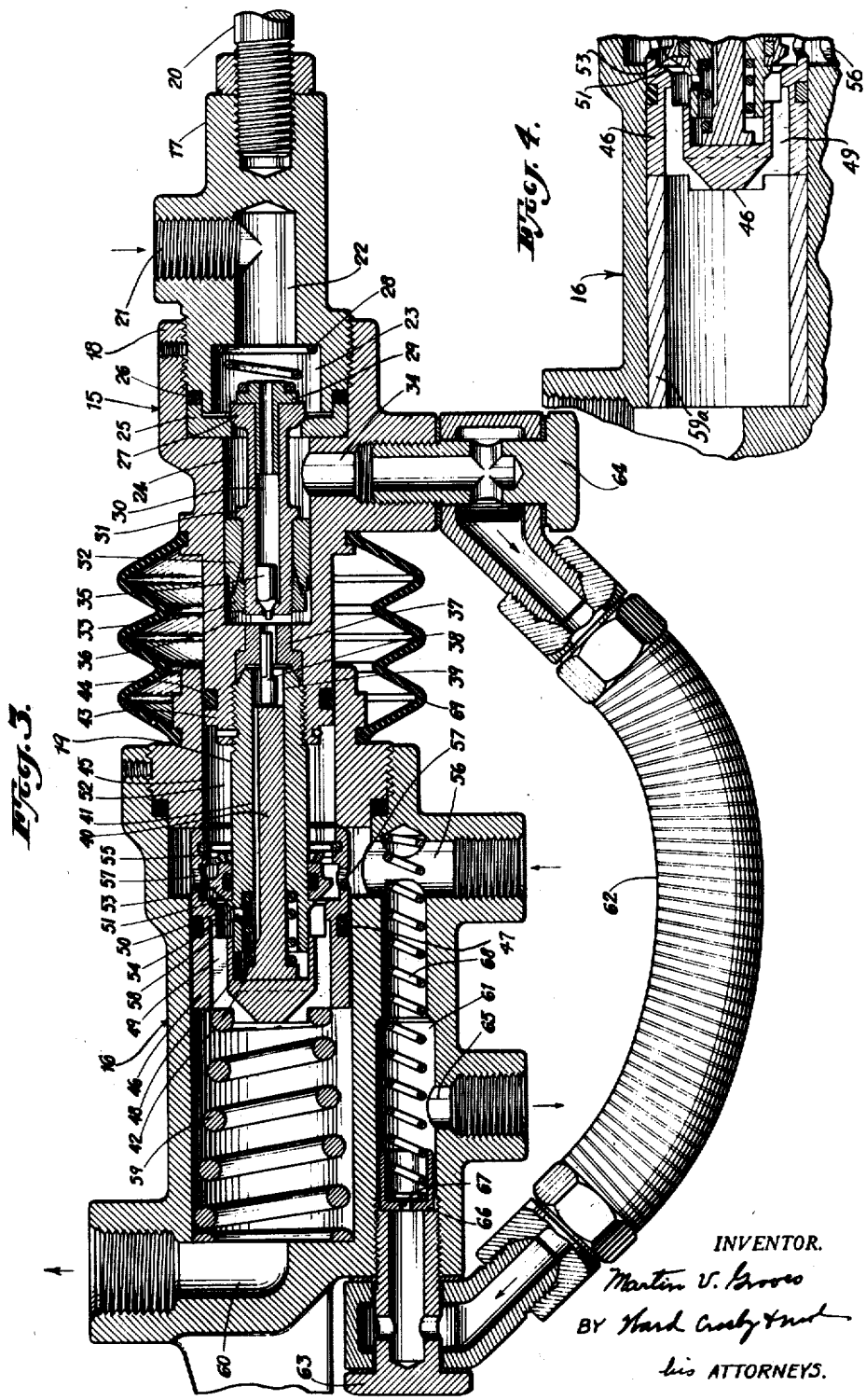
INVENTOR.
Martin V. Groves
BY Hard Crosby *nd*
his ATTORNEYS.

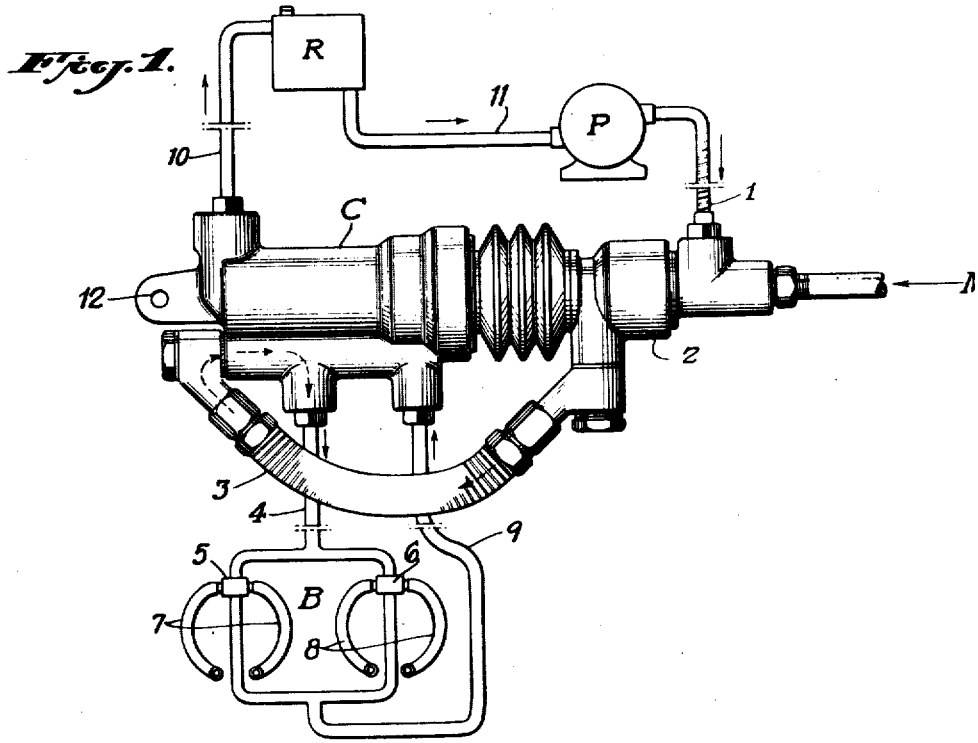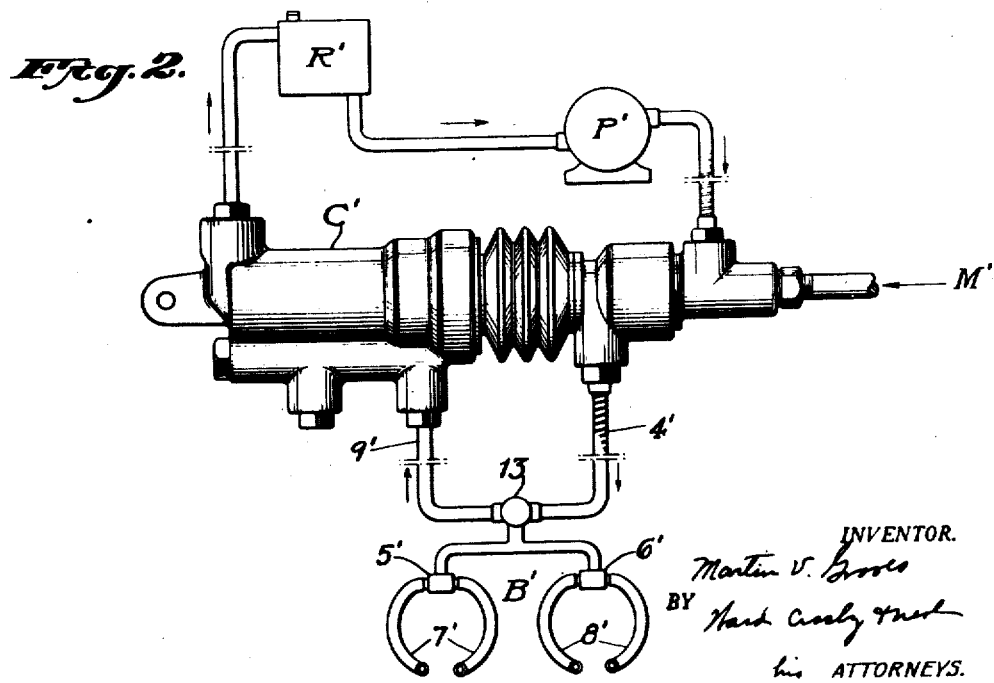

Patented Oct. 12, 1948

2,451,335

UNITED STATES PATENT OFFICE 2,451,335

CONTROL VALVE MEANS FOR POWER-OPERATED HYDRAULIC MOTIVE MEANS

Martin V. Groves, Brooklyn, N. Y., assignor of one-half to Arthur Wilde and Arthur Hull-Ryde, jointly, both of Bayside, N. Y.

Application March 10, 1944, Serial No. 525,854

21 Claims. (Cl. 121—41)

This invention relates to power operated hydraulic means and control therefor. The invention contemplates the use of a source of hydraulic pressure, such as a hydraulic pump, in the actuation of hydraulic motive means under the manual control of the operator and under the reaction influence of the hydraulic fluid pressure imposed upon the hydraulic motive means. The invention comprises the hydraulic system as well as the control means therefor. In some respects the invention is an improvement over certain features of my copending application Serial No. 491,181, filed June 17, 1943, for "Fluid pressure systems and actuators therefor."

In the actuation of hydraulic motive means, such as hydraulic brakes for airplanes, hydraulic pressure fluid has been utilized from an oil pump and the manual control has taken the form of a valve interposed in the fluid pressure line between the pump and brakes. In such prior art devices, the operator merely knew whether or not the valve was open or closed; but had no way of getting the "feel" of the brakes. In my said copending application, I provide a control means for producing this "feel" in combination with manual actuating means.

The chief object of the present invention is to avoid certain difficulties of operation heretofore experienced under specific conditions; such as (1) where the volume of fluid required varies without a variation of pressure for a given control application (i. e., as in a brake where the brake motor expands due to heat in the application of the brake), and (2) where large volumes of fluid are required through long lines, and resultant back pressure results in poor or inaccurate control (i. e., as in brakes where hard pedal, brake lag, over control or slow brake release manifest such difficulties).

Another object of the present invention is to provide a hydraulic system of the character described in which power actuation is effected by manual control which produces on the senses of the operator a faithful indication of the actual operative condition of the hydraulic motive means, such as brakes, which are being operated.

Another object of the invention is to provide manually operable control means for power operated hydraulic motive means, which control means are sensitive to the fluid pressure in the hydraulic motive means.

Another object of the invention is to provide a hydraulic system of the character described having manually operable control means providing a predetermined control reaction of characteristics similar to the hydraulic motive means being actuated.

Another object of the invention is to provide a manually actuated control unit for producing a reaction upon an operator commensurate with the hydraulic power produced by the motive means.

The invention consists in the novel features, arrangement and combination of parts embodied by way of example in the apparatus hereinafter described as illustrating the preferred forms of the invention, and the invention will be more particularly pointed out in the appended claims.

Further objects, features and advantages of the invention will more clearly appear from the detailed description given below taken in connection with the accompanying drawings which form a part of the specification.

Referring to the drawings—

Fig. 1 is a somewhat diagrammatic view of the hydraulic system embodying the invention;

Fig. 2 is a similar view showing a modification of Fig. 1;

Fig. 3 is a side elevational view in cross-section showing the control unit by which the hydraulic system illustrated in Figs. 1 and 2 is operated; and Fig. 4 is a fragmentary section view of a part of Fig. 1 showing the alternative use of a solid sleeve instead of a spring.

Referring to the drawings and more particularly to Fig. 1, a suitable source of power fluid pressure, such as the power-driven pump P is connected by the power input line 1 to the control means, such as the unit designated in its entirety as C, to emit pressure fluid through a valve controlled chamber designated in general as 2 (to be more particularly described hereinafter) into a power conduit 3 which serves to introduce the pressure fluid into another part of the control unit C and thence outwardly therefrom through a power output line 4 to hydraulic motive means to be operated, such as the hydraulic brake mechanism designated in general as B, which in the present embodiment comprises a pair of hydraulic motors 5—6 for actuating the expandable pairs of brake shoes 7—8. In the present embodiment, the hydraulic motors 5—6 represent piston actuating motors; but it is to be understood that the hydraulic motors may take other forms such as diaphragm motors, and may be employed for other uses than the actuation of brake mechanism. The hydraulic motors 5—6 are connected through a parallel circuit line 9 back to the control unit C, and this line serves as a reaction line, which relates to one of the important features of the invention. Because of a very small fluid displacement through this reaction line 9, the line resistance is very low and hence there is no appreciable pressure line drop from the hydraulic motive means B to the control unit C even where the said units are spaced a great distance apart. However, since there is an appreciable flow or displacement of fluid through the power output line 4, there is a substantial line drop in pressure where the units are spaced far apart, and it is for this reason that the pressure in the power line from the pump P to the mechanism B to be actuated does not provide very sensitive indication at the control unit of the actuation of the mechanism B. Exhaust fluid from the control unit C is in communication through a return line 10 to a reservoir R which is connected by a line 11 with the low pressure or input side of the pump P. The control unit C may be conveniently anchored at one end, as at 12, and manual actuating pressure applied at the opposite end in the direction indicated at M. The lines 1 and 3 are flexible to permit relative movement of the connected parts; and the lines 4, 9 and 11 are preferably flexible, in whole or in part, to provide for a slight pivotal movement of unit C about its anchor point 12.

Referring more particularly to Fig. 2: A slightly modified hydraulic system is illustrated which is the same as that previously described with the following exceptions. Instead of the pressure fluid passing through the conduit 3 back to the control unit C, it passes directly to the power output line designated 4'; and instead of the line 4' passing directly to the hydraulic motors designated 5'—6', the line passes through a suitable header 13 which is also in liquid communication with the reaction line here designated 9', instead of the reaction line being entirely separately connected to the hydraulic motors 5'—6' as in the previous embodiment. In this connection, it is noted that in both embodiments the power line to the mechanism B and the reaction line provide parallel circuits a substantial part of the distance between the control unit C and mechanism B; the required extent of the parallel circuits being determined largely by the distance between the units C and mechanism B to be operated.

While the embodiment illustrated in Fig. 1 provides a certain advantage over the modification of Fig. 2, and gives a smoother and more sensitive control, and is somewhat more rapid in response; nevertheless the modification of Fig. 2 may be usefully employed and may be found desirable in certain installations: all of which will be more clearly understood from the description hereinafter.

Control unit

In the present embodiment the control means C conveniently takes the form of a unitary device more fully shown in Fig. 3 which comprises in general a plunger portion 15 and a body portion 16. For convenience in manufacture and assembly, the plunger portion is made in three sections comprising respectively an outer member 17, an intermediate member 18 and an inner member 19. The outer member 17 is provided with suitable means by which manual actuation may be imparted thereto, such as an actuating shaft 20 whose inner end is rigidly secured to the member 17 and whose outer end provides suitable means for manual actuation, such as through a brake pedal or other suitable part engageable by the operator. Member 17 is provided with a power input line inlet 21 to which may be attached, as by a threaded connection, the power input line 1 (Fig. 1); and the opening 21 is in communication with an axial bore 22 whose inner end is in communication with a bore 23 of larger diameter; the bores 22 and 23 being formed in the member 17. The member 15 is provided with a bore 24 of somewhat smaller diameter than the bore 23 and in axial alignment therewith. A valve seat member 25 is disposed on a shoulder provided in the member 15 and is held thereagainst by the inner end of the member 17 between which and the member 25 a sealing ring 26 is disposed to provide a liquid seal. The valve seat 25 is provided with a valve opening or throat of smaller diameter than the bore 24, and the head of a power operating valve 27 serves as a means of opening and closing the valve throat in the member 25. The valve 27 is normally urged to seated or closed position by means of a helical compression spring 28 disposed in the bore 23 and whose inner end engages the head of a hollow plug 29 whose stem is disposed in an axial passage 30 provided in the stem of valve 27. The said stem is provided with an exterior shoulder 31 against which the outer end of a piston 32 is held as by a conical screw ring 33; the piston 32 preferably having a lap fit within the bore 24 which serves as a cylinder for said piston, and said piston and cylinder provide hydraulic means for actuating the pressure operating valve 27 in the manner to be more particularly pointed out hereinafter. The bores 22, 23 and the outer end of bore 24 jointly provide a passage through which the flow of power fluid is controlled by the valve 27, and this passage is provided with an outlet 34 through which power fluid passes for the actuation of the hydraulic motive means B (Figs. 1 and 2).

The bore 30 terminates near the inner end of the stem of valve 27 in a smaller passage provided with a valve seat on which is positioned a control valve needle 35 for opening and closing the outlet from the bore 30 into a pressure chamber 36 provided between the inner end of the bore 24 and the corresponding end of the piston 32. The plunger member 18 is provided with an axial bore in which is seated an exhaust valve sleeve 37 held in position by the outer end of the plunger member 19 which is suitably rigidly secured to the inner end of the member 18 so as to be integral therewith. The sleeve 37 is provided with an axial cylindrical bore in alignment with the needle valve 35, and carries disposed therein for axial movement with respect thereto a plunger 38 whose outer end is fluted and whose inner end is cylindrical and of a diameter to close the opening in the sleeve 37. The plunger member 19 is provided with an axial bore 39 therethrough and carries disposed therein a valve actuating pin 40 which is fluted as at 41 to permit the passage of exhaust fluid from the cylinder chamber 36 through the bore 39. The inner end of the pin 40 is provided with a head between which and the plunger member 19 a helical spring 42 is disposed to resiliently hold the inner end of the pin forwardly spaced from the corresponding end of the plunger member 19. In this position the valve plunger 38 is disposed with its fluted end in the bore of sleeve 37 to thereby permit exhaust liquid to pass outwardly from the chamber 36; and the parts are so proportioned that upon movement of the pin 40 in a direction to compress the spring 42, the pin moves the cylindrical end of the valve plunger 38 into the bore of sleeve 37 to close the exhaust valve, and thereafter the outer end of plunger 38 engages the adjacent end of needle valve 35 and lifts the valve from its seat to admit pressure fluid into the chamber 36 to thereby open the power valve 27.

The inner end of the plunger member 19 is provided with a piston head 43 having a piston ring 44, in the present embodiment made of suitable resilient material such as rubber or the like, in engagement within the outer end of a cylinder 45 provided in the outer end of the body 16. In the present embodiment, in order to facilitate manufacture, this outer end is made of a separate piece integrally united with and in sealed relation to the remainder of the body 16. The inner end of the cylinder 45 carries operatively disposed therein a second piston 46 provided with a suitable piston ring 47 in operative engagement with the inner end of said cylinder; and in the present embodiment the piston 46 is of a larger diameter than the piston 43. The head of piston 46 is provided with an axial recess 48 in which is slidably disposed the inner end of the plunger member 19 so that in normal position the head of the actuating pin 40 is seated against the bottom of the recess and the inner end of the plunger member 19 is spaced from the bottom of the recess to permit relative inward movement so as to permit the relative movement of the pin 40 to actuate the valves 38 and 35 in the manner above described. The skirt of piston 46 is spaced from the central portion (in which the recess 48 is disposed) by means of radial fins or webs between which are provided longitudinally extending circumferentially disposed passages 49 in communication through an annular passage 50 with an exhaust valve opening 51 provided in the head of piston 46 for venting the cylinder chamber 52; and an exhaust or vent valve 53 is provided for opening and closing the valve opening 51. The valve 53 is in the form of a ring in sealed relationship with and surrounding the plunger member 19 and supported from a shoulder 54 permitting forward movement of the plunger with respect to the valve 53 when the valve is in closed position and serving to hold the valve open when the plunger is in outward or retracted position. Suitable lock ring means 55 is secured to the piston 46 and serves to limit the outward movement of the plunger member 19 with respect to the piston 46. It will also be noted that the outer end of the piston 46 is limited in its outward travel by the shoulder provided between the small and large diameters of the cylinder 45. The cylinder chamber 52 is provided with an opening 56 which is adapted to be placed in communication with the reaction line such as 9 (Fig. 1), as by suitable threaded connections; the outlet 56 and the cylinder chamber 52 being placed in communication by suitable openings provided in the lock ring 55 and openings such as 57 provided in the outer sleeve of the piston 46. It is also noted at this point that the longitudinal passages 49 and annular passage 50 are in liquid communication with the lower end of the bore 39 in the plunger member 19 by means of passages such as 58. The piston 46 is urged outwardly by means of a helical coil spring 59 which is disposed in the inner end of the large bore of cylinder 45; this spring functioning as a reaction spring and preferably being of conical formation so as to give the desired pedal conditions, i. e., as the spring is compressed, progressively greater force is required, and the spring is preferably calibrated to correspond with the device to be operated. This spring, in the present embodiment, also serves the dual purpose of retracting the plunger to normal position. The innermost end of the cylinder bore in which the spring 59 is disposed is provided with a return line outlet 60 for communication through suitable threaded connection with the return line 10 (Fig. 1) placing the exhaust fluid in communication from the reservoir.

The body 16 is provided with a cylindrical bore 61 in communication at one end with the cylinder outlet 56 and whose other end is in communication with the power valve outlet 34 through suitable conduit means comprising a flexible high pressure tubing or hose 62 attached at its opposite ends to the respective connectors such as 63 and 64 serving to place the hose in liquid communication respectively with the passage 61 and outlet 34. The passage 61 intermediate its ends is provided with an outlet 65 adapted for communication with the pressure outlet line 4 (Fig. 1) by suitable threaded connections. A relief valve 66 is operatively disposed within the cylindrical bore 61 and in the present embodiment is provided with a relatively small opening 67, which may be varied in size to facilitate suitable calibration. The valve 66 is normally held in the position indicated in the drawings against a suitable stop, such as the inner end of the connector 63, by means of a helical compression spring 68, and in said normal position serves to restrict and substantially close the passage between the pressure conduit 62 and the power line outlet 65 while providing free communication between the power output outlet 65 and the cylinder outlet 56: however, upon emission of fluid pressure through the conduit 62 the valve 66 is moved beyond the power output outlet 65 and between said outlet and the cylinder outlet 56, thereby placing the power conduit 62 in free communication with the power output outlet 65 while restricting the communication between the latter outlet and the cylinder outlet 56.

*Operation*

Upon manual actuation inwardly of the actuating shaft 20, the plunger 15 initially moves inwardly with respect to the large piston 46, thereby bringing the main exhaust valve 53 into engagement with its seat, and causing relative movement of the valve actuating pin 40 in an outward direction with respect to the plunger against the spring 42, which causes the control valve plunger 38 to move to closed position and thereafter open the control valve needle 35 to admit pressure fluid through the opening 21, through the bore 30 of the valve 27 and into the cylinder 36; the fluid pressure in the cylinder 36 thereupon moving the piston 32, and with it the valve 27, to thereby open the pressure operating valve and admit pressure fluid entering the inlet 21 to flow outwardly through the power valve outlet 34. The power fluid from the outlet 34 passes through the power conduit 62 against the valve 66 and causes it to move beyond the power output outlet 65 thereby freely admitting power fluid through the output line 4 (Fig. 1) to the hydraulic motive means B. The reaction fluid pressure from the motive means B is exerted through the reaction line 9 (Fig. 1) through the cylinder outlet 56 into the cylinder chamber 52 where it exerts a reaction pressure on the pistons 43 and 46 in opposition respectively to the manual actuating pressure and the force exerted by the spring 59.

Due to the compressibility of the spring 59, the operator is permitted a further travel resulting in a movement of the plunger end 19 beyond the position necessary to close the valve 53 and actuate the control valves 35 and 38 and open the power valve 27. The following details of operation will facilitate an understanding of the cycle of operation.

The spring 59 is calibrated so as to compress a certain distance for a given hydraulic load on piston 46. Upon the inward manual operative movement of the shaft 20 the piston 43 (integral with the plunger member 15 and actuating rod 20) and the piston 46 will move forward in their respective bores and relatively toward each other. Piston 46 during its forward movement will compress the spring 59, such forward movement of the piston 46 being caused by fluid under pressure in the brake system and chamber 52, which pressure is generated by the power source P and the displacement of piston 43. Due to the volume of pressure fluid admitted to chamber 52, piston 46 will move relatively away from piston 43 and this will cause the inlet valve train (40, 38, 35, 27, referred to hereafter as "27 etc.") to operate so as to close the power valve 27 and thereby shut off the admission of pressure fluid from the power source P. However, with rod 20 moving forward under manual operation the piston 43 will continue its progressive forward movement, but the closing of the fluid from the power source P will stop the forward movement of piston 46 except for such movement as is caused by the displacement of fluid in chamber 52 due to the forward travel of piston 43.

In this phase of operation, the pistons 43 and 46 will move relatively toward each other until this relative movement causes the valve train 27 etc. to operate so as to admit additional fluid into the brake system and control chamber 52, in the manner previously described.

It will thus be seen that this piston and valve arrangement is such that progressive forward movement of piston 43 will cause a shuttle action of the inlet valve train 27 etc., which will calibrate the admission of fluid from the power source P so that the movement of piston 46 will faithfully follow and be determined by the movement of the pilot piston 43. The hydraulic pressure required to move piston 46 against spring 59 to the position determined by the movement of the pilot piston 43 will be the p. s. i. developed in the brake system. The hydraulic pressure reacting against piston 43 will give the operator a reaction which increases directly in proportion to the movement of the brake pedal (rod 20) and the resultant rise of pressure in the brake system. Thus, the operator will be given a true indication of the hydraulic pressure imposed upon the motive means. The function of the spring 59 and its compression piston 46 is to cause a predetermined movement of the actuating shaft 20 for a given hydraulic pressure in the brake system and in view of the conical shape of this spring, the more it is compressed the greater force will be required by the operator to effect further movement, i. e., the operator will receive a reaction which increases directly in proportion to the movement of the pedal. When the operator has secured the desired brake application and desires to hold the brake at the desired pressure the movement of the actuating shaft 20 and piston 43 ceases. As long as the operator holds this position of applied pressure the inlet valve train 27 etc. will cease functioning and the exhaust valve 53 will remain closed; the pistons 43 and 46 will remain in their respective positions in the cylinder housing and the brake system will remain at the applied pressure. It will be noted that in the event that the inlet valve 27 should leak upon closing, the leakage would cause pistons 43 and 46 to move relatively away from each other until the exhaust valve 53 is moved from its seat. This will allow the leakage to pass through the valve 53 to the reservoir R and prevent further movement of the piston 46 and the subsequent buildup of pressure in the brake system. So long as the actuating shaft and piston 43 are not moved to a different position the brake maintains the applied pressure.

It will be seen from the foregoing that the reaction hydraulic pressure thus imposed on the piston 43 must at all times be equal and opposite to the manual pressure exerted by the operator in order to maintain the fluid pressure line open, and it will thus be seen that regardless of the pressure drop in the power output line between the control unit and the motive means being actuated, there will always be a governing pressure accurately determining the actuation of the control unit in accordance with the actual pressure exerted on the hydraulic motive means.

It will be noted that the valve 66 is actuated to a position between the openings 65 and 56 by the pressure differential between the pressure fluid and the reaction fluid and that when there is a substantial equilibrium of fluid pressures on opposite sides of the valve the spring 68 returns the valve to its outer or opposite position against the inner end of the plug 65. When the valve 66 is held inwardly, by the pressure differential, it prevents surges or sudden changes in pressure fluid from being imposed on the reaction fluid; and thus insures fidelity of reaction fluid pressure.

To release the power actuation, the operator releases the manual pressure and the plunger 15 as a whole is returned under the pressure in the cylinder chamber 52 and through the expansion of the spring 59. During the first portion of this return, valve 53 remains seated and the two pistons move outwardly together, and thereafter the piston 43 continues to move outwardly away from the piston 46 to thereby close the power control valve 35, open the control exhaust valve 38, which causes the power valve 27 to be closed, and open the main exhaust valve 53; which cycle of events permits the exhaust liquid from the power valve actuating chamber 36 to pass through the bore 39, the fluting 41 in the pin 40, through the passages 58 and, with the liquid from the cylinder chamber 52, to be returned through the passages 49 and 50 outwardly through the outlet 60 and back to the reservoir.

In connection with the foregoing, it is pointed out that the effective area of the head of the power valve 27 serves to maintain this valve closed under pressure fluid; and this effective area acting in one direction is less than the effective area of the actuating piston 32 to thereby permit the pressure imposed on said piston in an opposite direction to open the valve when the control valve needle 35 is raised from its seat. To facilitate a visual appreciation of this the difference in these areas has been somewhat exaggerated in the drawings (Fig. 3). It is likewise to be noted that the effective area of the main exhaust valve 53 is less than the effective area of the piston 43, to permit the valve 53 to open. While it is not essential to have the piston 46 larger than the piston 43; nevertheless this is desirable because the differential in pressure areas of these pistons serves as an immediate indication to the operator in the event that there should be a failure in the hydraulic motive means, such as by a leak in the power line, and also permits the use of a relatively heavy spring 59 as compared to the manual pressure exerted by the operator. For example, in the present embodiment of the invention, there is a relative compounding between the small and large pistons in the ratio of two to one, so that for a manual force of 250 pounds exerted by the operator, the large piston exerts a compressive force of 500 pounds on the spring 59. It is also desirable that the pressure for which the hydraulic motive means is designed or calibrated be substantially less than the power pressure supplied by the pump P. In the present embodiment, for example, the hydraulic motive means is designed for maximum operation by a pressure of 275 pounds per square inch, whereas the pump furnishes a power pressure of the order of 1500 pounds per square inch.

The use of the valve 66 (which is employed in the system illustrated in Fig. 1) permits a quicker releasing action, and by suitably varying the hole 67 in the valve 66 calibration is facilitated and an efficient means is provided for preventing any tendency to lag. It is also noted that the control needle valve 35 is in the nature of a metering valve and during the entire range of operation of the device the power valve 27 being subjected, or capable of being subjected, to pressure fluid on opposite ends, the actuation of the valve is positive but quite desirably sensitive; and the operation throughout the entire range is especially smooth. It is also noted that with the possible exception of the single piston ring 44 on the piston 43, a reasonable degree of leakage through the control unit has little if any effect on the operation of the system, because of the output volume of the pump P, only a small part of which is required for the efficient actuation desired. Even a leakage in the piston ring 44 will not materially interfere with the operation of the system except in so far as a substantial loss of fluid from the system is concerned; and it is noted in this connection that, if desirable, the bellows sleeve 69 between the plunger 15 and body 16 (which normally serves only as a dust shield) could be utilized to collect any leakage past the piston ring 44 and could readily be placed in communication with the return line to the reservoir.

The control unit above described with reference to Fig. 3 is adapted to be utilized in the modified system illustrated in Fig. 2 by making the following simple adjustments. The connector 63 in its entirety and the valve 66 and its spring 68 could be removed and the end of the bore 61 could be closed by a pipe plug and the outlet 65 could be similarly closed by a pipe plug. The pressure conduit 62 could then be disconnected from the connector 63 and attached directly to the power output line such as 4'; or, in the alternative, the output power line 9' could be connected directly to the power valve outlet 34 in place of the connector 64. In this modified system, the control unit would still be placed directly under the influence of reaction pressure fluid from the hydraulic motive means B' (Fig. 2) and except for the benefits inherent in the use of the valve 66, some of which have been above referred to, the apparatus would operate as above pointed out.

As above pointed out, the use of this retraction spring 59 and second piston 46 (and particularly where the second piston is larger) permits a relatively long travel of the manual actuating member, which more nearly simulates the usual travel of such member in the conventional operation of mechanism such as brakes, while permitting accurate control throughout the cycle of actuation. However, various other advantages of the invention are not limited to the use of a second piston and yieldable reaction means such as the reaction spring 59. As a means of readily explaining such a modification the spring 59 may be replaced by a non-yieldable sleeve 59a in the manner shown in Fig. 4, where other parts identical with those of Fig. 3 bear the same numerals. With the solid sleeve 59a interposed between the inner end of the large diameter of the cylinder 45 and the inner end of the piston 46, the piston 46 is rigidly locked against axial movement in either direction, and thereby in effect piston 46 becomes a rigid part of the body member 16 and the member 46 thereby becomes the effective inner end of the cylinder chamber 52. With this construction, the travel of the plunger member 15 would be limited to the space between the inner end of the plunger member 19 and the bottom of the axial recess 48. When the plunger member is pushed inwardly, the main exhaust valve 53 would be closed, the control exhaust valve 38 would be closed, the control needle valve 35 would be opened and the power valve 27 thereby opened to actuate the hydraulic motive means in the manner previously described; and, conversely, upon release of the manual actuating pressure, the plunger 15 would be returned to normal position by suitable retractile means and the aforesaid valves returned to their opposite or normal position to thereby shut off the pressure fluid from the hydraulic motive means.

Having thus described my invention with particularity with reference to preferred forms, and having described and referred to certain modifications, it will be obvious to those skilled in the art, after understanding my invention, that various changes and other modifications may be made therein without departing from the spirit and scope of my invention, and I aim in the appended claims to cover such changes and modifications as are within the scope of the invention.

What I claim is:

1. In a hydraulic system, the combination of hydraulic motive means, a source of hydraulic pressure fluid for said hydraulic motive means, control means spaced from said hydraulic motive means and said pressure fluid source and in liquid communication with said pressure fluid source through a first power conduit line and with a return conduit line for returning fluid to said source, said control means being in parallel liquid communication with said hydraulic motive means through a reaction conduit line and a second power conduit line, said control means comprising a single cylinder chamber in liquid communication with said reaction conduit line and with said return conduit line, a passage connecting said first and second power conduit lines, a manually operable piston in said cylinder, valve means carried by and movable with said piston and interposed in said passage for controlling the communication between said first and second power conduits when said piston is moved in one direction, said valve means comprising a part movable with and with respect to said piston, and valve means comprising a valve part carried separately from said piston and a cooperating valve part operable responsive to the movement of said piston in an opposite direction to vent said cylinder chamber to said return conduit and by the opposite movement to close said vent.

2. In a hydraulic system for actuating a device, the combination of a source of hydraulic pressure, hydraulic motive means for moving said device, control means in liquid communication with said pressure source through a first power conduit and in parallel liquid communication with said hydraulic motive means for a major part of the distance between said control means and motive means through a reaction conduit and a second power conduit, said control means comprising a cylinder in liquid communication with said reaction conduit, a first passage connecting said first and second power conduits, a second passage connecting said reaction conduit and said second power conduit, a manually operable piston in said cylinder, operating pressure fluid valve means operable responsive to the movement of said piston and interposed in said first passage for controlling the communication between said first and second power conduits, a valve disposed for movement in said second passage and operable by fluid pressure differential between said pressure fluid and said reaction fluid, and valve means operable responsive to the retractile movement of said piston to vent said cylinder and by the opposite movement to close said vent.

3. In a hydraulic system for actuating a device, the combination of a source of hydraulic pressure, hydraulic motive means for moving said device, control means in liquid communication with said pressure source through a first power conduit and in parallel liquid communication with said hydraulic motive means for a major part of the distance between said control means and motive means through a reaction conduit and a second power conduit, said control means comprising a cylinder in liquid communication with said reaction conduit, a first passage connecting said first and second power conduits, a second passage connecting said reaction conduit and said second power conduit and in alignment with a portion of said first passage, a manually operable piston in said cylinder, operating pressure fluid valve means operable responsive to the movement of said piston and interposed in said first passage for controlling the communication between said first and second power conduits, a valve disposed for movement in said second passage and said aligned portion of said second passage, resilient means for yieldably holding said valve between said first and second power conduits, said valve being movable intermediate said second power conduit and reaction conduit by fluid pressure differential between said pressure fluid and reaction fluid, and valve means operable responsive to the retractile movement of said piston to vent said cylinder and responsive to the opposite movement to close said vent.

4. In a hydraulic system for actuating a device, the combination of a source of hydraulic pressure, hydraulic motive means for moving said device, control means in liquid communication with said pressure source through a first power conduit and in parallel liquid communication with said hydraulic motive means through a reaction conduit and a second power conduit, said control means comprising a cylinder in liquid communication with said reaction conduit, a passage connecting said first and second power conduits, a manually operable piston in said cylinder, power operating valve means operable responsive to the movement of said piston for controlling the communication between said first and second power conduits, said valve means comprising a double-acting valve member disposed in said passage and operable by said pressure liquid for closing said valve and hydraulic means for opening said valve, a control valve for said hydraulic valve opening means, and valve means operable responsive to the rectractile movement of said piston to vent said cylinder and hydraulic valve opening means and by the opposite movement to close said vents, whereby upon manual actuation of said piston said vent valve means is closed placing said piston under the influence of fluid from said reaction conduit and said hydraulic valve opening means is subjected to pressure fluid to thereby open said power valve and admit power fluid to said hydraulic motive means, whereupon reaction fluid through said reaction conduit is thereby exerted on said piston with a force substantially equal but opposite to said manual force.

5. In a hydraulic system for actuating a device, the combination of a source of hydraulic pressure, hydraulic motive means for moving said device, control means in liquid communication with said pressure source through a first power conduit and in parallel liquid communication with said hydraulic motive means through a reaction conduit and a second power conduit, said control means comprising a cylinder in liquid communication with said reaction conduit, a passage connecting said first and second power conduits, a manually operable piston in said cylinder, valve means operable responsive to the movement of said piston for controlling the communication between said first and second power conduits, said valve means comprising a double-acting valve member having one end disposed in said passage and providing a first area subjected to said pressure liquid for closing said valve and having an oppositely disposed piston end in a cooperating cylinder and presenting a larger area, a control valve for admitting pressure fluid to said cylinder on said piston end for opening said valve, and valve means operable responsive to the retractile movement of said piston to vent said cylinder and valve piston cylinder and responsive to the opposite movement to close said vents, whereby upon manual actuation of said piston said vent valve means is closed placing said piston under the influence of fluid from said reaction conduit and said valve cylinder is closed subjecting said valve piston to pressure fluid to thereby open said power valve and admit power fluid to said hydraulic motive means, whereupon reaction fluid through said reaction conduit is thereby exerted on said piston with a force substantially equal but opposite to said manual force.

6. In a hydraulic system for actuating a device, the combination of a source of hydraulic pressure, hydraulic motive means for operating said device, control means in liquid communication with said pressure source through a first power conduit and in parallel liquid communication with said hydraulic motive means for a major part of the distance between said control means and motive means through a reaction conduit and a second power conduit, said control means comprising a cylinder in liquid communication with said reaction conduit, a passage connecting said first and second power conduits, a manually operable piston in said cylinder, valve means operable responsive to the manual movement of said piston providing an operating pressure fluid valve interposed in said passage for controlling the communication between said first and second power conduits, said valve means comprising pressure fluid actuating means for said operating valve and mechanism for controlling the actuating means in accordance with the movement of said piston, and valve means in communication with said cylinder operable responsive to the reverse movement of said piston to vent said cylinder and responsive to the opposite movement to close said vent, whereby upon manual actuation of said piston said vent valve is closed placing said piston under the influence of fluid from said reaction conduit and said power valve is opened admitting power fluid to said hydraulic motive means, whereupon reaction fluid through said reaction conduit is thereby exerted on said piston with a force substantially equal but opposite to said manual force.

7. In a hydraulic actuating system, the combination of a source of hydraulic pressure, hydraulic motive means, control means in liquid communication with said pressure source through a first power conduit and in parallel liquid communication with said hydraulic motive means through a reaction conduit and a second power conduit, said control means comprising a cylinder, a passage connecting said first and second power conduits, a first piston in said cylinder manually operable in one direction, a second piston movable in one direction by fluid displaced by said manual operation of said first piston, said reaction conduit being in liquid communication with said cylinder intermediate said pistons, means for urging said second piston in the opposite direction to exert fluid pressure on said first piston in opposition to said manual operation, power controlling valve means operable by the manual movement of said first piston and interposed in said passage for controlling the communication between said first and second power conduits, and valve means operable by the movement of said first piston in said opposite direction to vent said cylinder and by the manual movement of said first piston to close said vent.

8. In a hydraulic actuating system, the combination of a source of hydraulic pressure, hydraulic motive means, control means in liquid communication with said pressure source through a first power conduit and in parallel liquid communication with said hydraulic motive means through a reaction conduit and a second power conduit, said control means comprising a cylinder, a passage connecting said first and second power conduits, a first piston in said cylinder manually operable in one direction, a second piston in said cylinder movable in the same direction by fluid pressure between said pistons, said reaction conduit being in liquid communication with said cylinder intermediate said pistons, means for urging said second piston in the opposite direction to exert fluid pressure on said first piston in opposition to said manual operation, power controlling valve means operable by the relative movement of said first and second pistons in one direction and interposed in said passage for controlling the communication between said first and second power conduits, and valve means operable by the relative movement of said pistons in the other direction to vent said cylinder and by the said first relative movement of said pistons to close said vent.

9. In a hydraulic actuating system, the combination of a source of hydraulic pressure, hydraulic motive means, control means in liquid communication with said pressure source through a first power conduit and in parallel liquid communication with said hydraulic motive means through a reaction conduit and a second power conduit, said control means comprising a cylinder, a passage connecting said first and second power conduits, a first piston in said cylinder manually operable in one direction, a second piston in said cylinder movable in the same direction by fluid pressure between said pistons, means for urging said second piston, said reaction conduit being in liquid communication with said cylinder intermediate said pistons, in the opposite direction to exert fluid pressure on said first piston in opposition to said manual operation, power controlling valve means comprising a power valve interposed in said passage for controlling the communication between said first and second power conduits and normally held in closed position by hydraulic pressure, hydraulic actuating means for opening said power valve, a control valve for said power valve actuating means and mechanical means interposed between said pistons for operating said control valve by the relative movement of said first and second pistons, and valve means operable responsive to the relative movement of said pistons to vent said cylinder and power valve actuating means when said control valve is closed and to close said vents before said control valve is opened.

10. In a hydraulic actuating system, the combination of a source of hydraulic pressure, hydraulic motive means, control means in liquid communication with said pressure source through a first power conduit and in parallel liquid communication with said hydraulic motive means through a reaction conduit and a second power conduit, said control means comprising a cylinder, a passage connecting said first and second power conduits, a first piston in said cylinder manually operable in one direction, a second relatively larger piston in said cylinder movable in the same direction by fluid pressure between said pistons, said reaction conduit being in liquid communication with said cylinder intermediate said pistons, means for urging said second piston in the opposite direction to exert fluid pressure on said first piston in opposition to said manual operation, power controlling valve means interposed in said passage for controlling the communication between said first and second power conduits and operable responsive to the relative movement of said first and second pistons in a first direction to open said communication and in the other direction to close said communication, and valve means operable responsive to the relative movement of said pistons in said other relative direction to vent said cylinder and responsive to the said first relative direction to close said vent.

11. In a hydraulic actuating system, the combination of a source of hydraulic pressure, hydraulic motive means, control means in liquid communication with said pressure source through a first power conduit and in parallel liquid communication with said hydraulic motive means through a reaction conduit and a second power conduit, said control means comprising a cylinder, a passage connecting said first and second power conduits, a first piston in said cylinder manually operable in an actuating direction, a second piston in said cylinder movable in the same direction by fluid pressure between said pistons, said reaction conduit being in liquid communication with said cylinder intermediate said pistons, resilient means for urging said second piston in the opposite direction to exert fluid pressure on said first piston in opposition to said actuating direction, power controlling valve means operable responsive to the movement of said first piston in said actuating direction for effecting the communication between said first and second power conduits through said passage, and relief valve means operable responsive to the movement of said first piston in the other direction to vent said cylinder and responsive to the opposite movement of said first piston to close said vent, said relief valve means comprising a valve member movable with and relative to said first and second pistons and having an effective area less than said first piston.

12. In a hydraulic actuating system, the combination of a hydraulic cylinder, a piston operatively disposed therein, and providing therewith a cylinder chamber conduit means in communication with said cylinder chamber for imposing on said piston pressure fluid from hydraulic motive means to be operated, manual actuating means rigidly attached to and movable with said piston in a direction opposite to said imposed hydraulic pressure, a source of hydraulic pressure, conduit means exterior said chamber interconnecting said pressure source to said motive means, first valve means disposed in said last conduit means and mounted on and movable with said piston, means for operating said valve means upon predetermined movement of said piston and second valve means for venting said cylinder, said second valve means comprising a valve member mounted separately from and movable relative to said piston.

13. In control means for a hydraulic actuating system, the combination of a hydraulic cylinder, a piston operatively disposed therein, means for placing said cylinder in communication with hydraulic motive means to be operated for imposing on said piston pressure fluid from said hydraulic motive means, manual actuating means rigidly attached to and movable with said piston for moving said piston in a direction opposite to said imposed hydraulic pressure, a valve housing mounted for movement with said piston and providing means of interconnection between a pressure source and said motive means, a first valve disposed in said valve housing, means also movable with said piston for controlling the operation of said valve upon predetermined movement of said piston and a second valve movable and with respect to said piston for venting said cylinder.

14. In control means for a hydraulic actuating system, the combination of a hydraulic cylinder, a piston operatively disposed therein, means for placing said cylinder in communication with hydraulic motive means to be operated for imposing on said piston pressure fluid from said hydraulic motive means, manual actuating means rigidly attached to and movable with said piston for moving said piston in a direction opposite to said imposed hydraulic pressure, conduit means mounted for movement with said piston and providing means of interconnection between a pressure source and said motive means, a first valve disposed in said conduit means, means also movable with said piston for controlling the operation of said valve upon predetermined movement of said piston and a second valve movable with and with respect to said piston for venting said cylinder.

15. In control means for a hydraulic actuating system, the combination of a hydraulic cylinder, a first piston and a second piston operatively disposed therein, the adjacent ends of said pistons and said cylinder providing a cylinder chamber, means for placing said chamber in communication with hydraulic motive means to be operated for imposing on said pistons pressure fluid from said hydraulic motive means, manual actuating means for moving said first piston in a direction opposite to said imposed hydraulic pressure, resilient means urging said second piston toward said first piston, a valve housing mounted for movement with said piston and providing means of interconnection between a pressure source and said motive means, a first valve disposed in said valve housing, means movable with said first and second pistons for controlling the operation of said valve by relative movement of said pistons toward each other and a second valve movable to open position for venting said chamber by relative movement of said pistons away from each other and to closed position by relative movement of said pistons toward each other.

16. In control means for a hydraulic actuating system, the combination of a hydraulic cylinder, a piston operatively disposed therein, said cylinder having an outlet for placing said cylinder in communication with hydraulic motive means to be operated to thereby impose on said piston pressure fluid from said hydraulic motive means, manual actuating means for moving said piston in a direction opposite to said imposed hydraulic pressure, a valve housing mounted for movement with said piston and providing a pressure inlet opening and a pressure outlet opening, conduit means having one end in fluid communication with said pressure outlet opening and providing at the other end a power line outlet for communication with said motive means, a conduit interconnecting said cylinder outlet and power line outlet, a valve yieldably held in said last mentioned interconnecting conduit intermediate said pressure outlet opening and said power line outlet and movable past said power line outlet intermediate the latter and said cylinder outlet, a power operating valve disposed in said valve housing, means also movable with said piston for controlling the operation of said valve upon predetermined movement of said piston and an exhaust valve movable with said piston for venting said cylinder.

17. In control means for a hydraulic actuating system, the combination of a body having a hydraulic cylinder, a piston operatively disposed therein, said cylinder having an outlet for placing said cylinder in communication with hydraulic motive means to be operated to thereby impose on said piston pressure fluid from said hydraulic motive means, manual actuating means for moving said piston in a direction opposite to said imposed hydraulic pressure, a valve housing mounted for movement with said piston and providing an inlet and an outlet for power fluid, a power supply valve disposed in said valve housing, means movable with said piston for controlling the operation of said power supply valve upon predetermined movement of said piston, said body having a passage in communication at a first end with said cylinder outlet, conduit means placing the other end of said passage in liquid communication with said power valve outlet, said passage having an outlet intermediate its said ends for communication with said motive means, a valve in said passage yieldably held intermediate said second end and said intermediate outlet, said valve being movable in said passage to a position between said intermediate outlet and said cylinder outlet by pressure fluid from said valve housing, and an exhaust valve movable with said piston for venting said cylinder in alternate timed sequence with the closing of said power valve.

18. In a control device for power operated hydraulic motive means, the combination of a plunger manually operable in one direction and having a piston head movable therewith, a cylinder in which said piston head is operatively disposed, a valve passage provided in said plunger and having inlet and outlet openings for communication respectively with a hydraulic pressure power source and hydraulic motive means to be operated, a power operating valve in said passage for controlling the flow of fluid therethrough, power pressure actuating means for said power operating valve, control valve means for said valve actuating means, means movable by said plunger in said first direction for operating said control valve means to admit power pressure liquid to said actuating means, said cylinder being provided with an opening for communication with said motive means, to thereby provide a reaction pressure on said piston head from said motive means, and a normally open exhaust valve for venting said cylinder and operable to closed position by the movement of said plunger in said first direction.

19. In a control device for power operated hydraulic motive means, the combination of a plunger manually operable in one direction and having a piston head movable therewith, a cylinder in one end of which said piston is operatively disposed, a relatively larger piston operatively disposed in the other end of said cylinder, a reaction spring urging said larger piston toward said smaller piston, a valve passage provided in said plunger and having inlet and outlet openings for communication respectively with a hydraulic pressure power source and hydraulic motive means to be operated, a power operating valve in said passage for controlling the flow of fluid therethrough, power pressure actuating means for said power operating valve, control valve means for said valve actuating means, means disposed intermediate said pistons and movable by the relative movement of said pistons toward each other for operating said control valve means, said cylinder being provided with an opening for communication with said motive means, to thereby provide in said cylinder a reaction liquid pressure from said motive means, whereby said reaction liquid pressure is exerted on said pistons in opposition to forces exerted on said pistons by manual actuation and said reaction spring, and a normally open exhaust valve for venting said cylinder operable to closed position by the relative movement of said pistons toward each other and to open position by the relative movement of said pistons away from each other.

20. In a control device for power operated hydraulic motive means, the combination of a plunger manually operable in one direction and having a relatively small piston head movable therewith, a cylinder in which said piston is operatively disposed, a relatively large piston operatively disposed in said cylinder in spaced relation to said small piston to provide a cylinder chamber therebetween, said cylinder on the opposite end of said large piston being provided with an opening for connection with a reservoir, a valve passage provided in said plunger and having inlet and outlet openings for communication respectively with a hydraulic pressure power source and hydraulic motive means to be operated, a power operating valve in said passage for controlling the flow of fluid therethrough, power pressure actuating means for said power operating valve, control valve means for said valve actuating means, means movable by said small piston in said first direction for operating said control valve means to admit power pressure liquid to said actuating means, said cylinder chamber being provided with an opening for communication with said motive means, to thereby provide a reaction pressure on said pistons from said motive means, a reaction spring urging said large piston in opposition to fluid pressure in said cylinder chamber and yieldable upon predetermined pressure therein, and an exhaust valve interposed between said cylinder chamber and reservoir opening for venting said cylinder, said exhaust valve being normally held in open position by said plunger and being operable to closed position by the movement of said plunger in said first direction.

21. In a control device for power operated hydraulic motive means, the combination of a plunger manually operable in one direction and having a first piston head intermediate its operating outer end and its inner end, a cylinder in which said piston is operatively disposed, a second piston in said cylinder axially spaced from said first piston and provided with an axial recess receiving the inner end of said plunger, a valve passage provided in said plunger and having inlet and outlet openings for communication respectively with a hydraulic pressure power source and hydraulic motive means to be operated, a power operating valve in said passage for controlling the flow of fluid therethrough, power pressure actuating means for said power operating valve, a control inlet valve for said valve actuating means disposed in an axial bore through said power operating valve, an exhaust valve for said valve actuating means disposed in an axial bore in said plunger and engageable with said inlet valve, means movable by said piston in said first direction for operating said control inlet valve and exhaust valve comprising a valve actuating pin disposed in said last-mentioned axial bore and movable with and with respect to said first piston, said pin being disposed intermediate said first and second pistons for actuation by the relative movement of said pistons toward each other, said cylinder being provided with an opening for communication with said motive means, to thereby provide a reaction pressure on said piston from said motive means, and a normally closed relief valve for venting said cylinder and operable to closed position by the movement of said piston in said first direction.

MARTIN V. GROVES.

REFERENCES CITED

The following references are of record in the file of this patent:

UNITED STATES PATENTS

| Number | Name | Date |
| --- | --- | --- |
| 458,191 | Ripley | Aug. 25, 1891 |
| 1,817,903 | Aikman | Aug. 11, 1931 |
| 2,064,379 | Kundig | Dec. 15, 1936 |
| 2,133,275 | Andres | Oct. 18, 1938 |
| 2,345,531 | De Ganahl | Mar. 28, 1944 |
| 2,380,705 | Proctor | July 31, 1945 |
| 2,395,811 | Griffith | Mar. 5, 1946 |

FOREIGN PATENTS

| Number | Country | Date |
| --- | --- | --- |
| 407,092 | Great Britain | Mar. 15, 1934 |

Certificate of Correction

Patent No. 2,451,335.

October 12, 1948.

MARTIN V. GROVES

It is hereby certified that error appears in the printed specification of the above numbered patent requiring correction as follows:

Column 15, line 49, claim 13, after the word "movable" and before "and" insert *with*; and that the said Letters Patent should be read with this correction therein that the same may conform to the record of the case in the Patent Office.

Signed and sealed this 25th day of January, A. D. 1949.

[SEAL]

THOMAS F. MURPHY,
*Assistant Commissioner of Patents.*